(12) United States Patent
Kisko

(10) Patent No.: US 10,776,814 B2
(45) Date of Patent: Sep. 15, 2020

(54) METHOD OF DISTRIBUTING ADVERTISING INFORMATION WITH THE POSSIBILITY OF EVALUATING THE EFFICIENCY AND ANALYZING THE POTENTIAL AUDIENCE OF ADVERTISING AND INFORMATION STRUCTURES AS WELL AS USING THE INFORMATION RECEIVED FOR TARGETING THE AUDIENCE AND INDIVIDUAL COMMUNICATION

(71) Applicant: Boris Alexandrovich Kisko, Moscow (RU)

(72) Inventor: Boris Alexandrovich Kisko, Moscow (RU)

( * ) Notice: Subject to any disclaimer, the term of this patent is extended or adjusted under 35 U.S.C. 154(b) by 0 days.

(21) Appl. No.: 15/894,894

(22) Filed: Feb. 12, 2018

(65) Prior Publication Data

US 2018/0232758 A1 Aug. 16, 2018

(51) Int. Cl.
*G06Q 30/02* (2012.01)
*H04W 8/00* (2009.01)

(52) U.S. Cl.
CPC ..... *G06Q 30/0242* (2013.01); *G06Q 30/0261* (2013.01); *G06Q 30/0266* (2013.01); *G06Q 30/0271* (2013.01); *G06Q 30/0272* (2013.01); *H04W 8/005* (2013.01)

(58) Field of Classification Search
CPC .................................................. G06Q 30/0242

USPC ...................................................... 705/14.41
See application file for complete search history.

(56) References Cited

U.S. PATENT DOCUMENTS

| | | | |
|---|---|---|---|
| 9,262,775 B2 * | 2/2016 | Lamont | G06Q 30/0267 |
| 2010/0121567 A1 * | 5/2010 | Mendelson | G01C 21/206 |
| | | | 701/467 |
| 2011/0060652 A1 * | 3/2011 | Morton | H04W 4/043 |
| | | | 705/14.58 |
| 2012/0130796 A1 * | 5/2012 | Busch | G06Q 30/02 |
| | | | 705/14.36 |
| 2015/0032366 A1 * | 1/2015 | Man | H04W 4/046 |
| | | | 701/412 |
| 2015/0371270 A1 * | 12/2015 | McDevitt | G06Q 30/0267 |
| | | | 705/14.58 |
| 2016/0034961 A1 * | 2/2016 | May | G06Q 30/0261 |
| | | | 705/14.58 |
| 2016/0155150 A1 * | 6/2016 | Zhang | G06Q 30/0261 |
| | | | 705/14.58 |

* cited by examiner

*Primary Examiner* — Azam A Ansari
(74) *Attorney, Agent, or Firm* — Inventa Capital PLC

(57) ABSTRACT

The invention pertains to the means of providing advertising and information services and can be used in various environments, where a potential consumer is present and where there is an identifiable mobile device on condition that the advertising media are placed mainly on stands, posts, in and/or on buildings or other structures. In this method, a beacon (beacons) is placed in at least one advertisement medium, which generates a signal at a given periodicity, registers beacon signals with consumer mobile devices, and generates signals initiating the transfer of advertising packages to display advertisements in the advertising medium.

12 Claims, 1 Drawing Sheet

If $t^1$ and $t^2$ are known, the direction of movement can be determined

If $S^1$, $t^1$ and $S^2$, $t^2$ are known, the speed (V) can be determined $V=S/t$
$S^1+S^2/t^2-t^1=V=82+45/10:32:28-10:32:36=127/8=15.875$ m/s If $S^{ae}$ and V are known, the duration of advertising exposure – $t^{ae}$ can be determined $S^{ae}/V=t^{ae}=128/15.875=12.59$ s

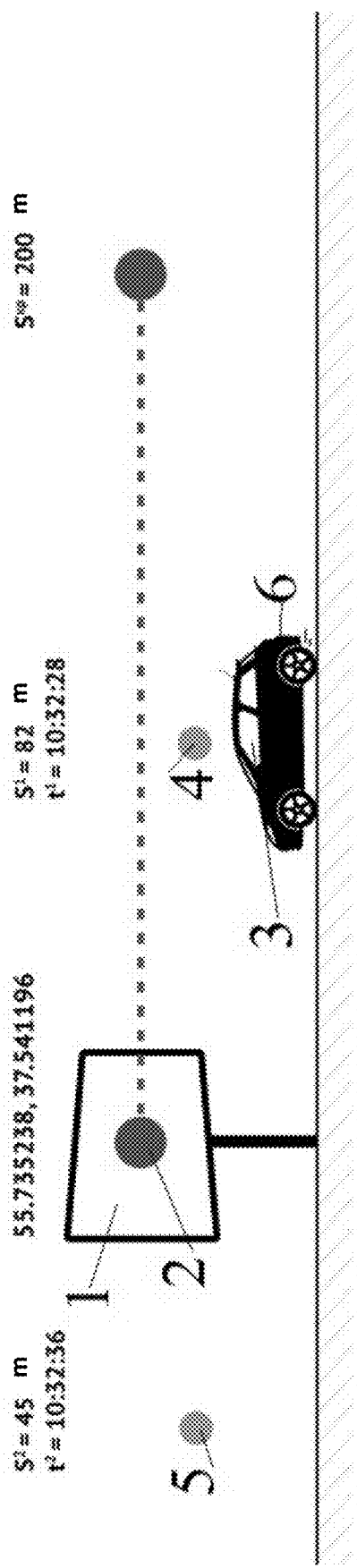

METHOD OF DISTRIBUTING ADVERTISING INFORMATION WITH THE POSSIBILITY OF EVALUATING THE EFFICIENCY AND ANALYZING THE POTENTIAL AUDIENCE OF ADVERTISING AND INFORMATION STRUCTURES AS WELL AS USING THE INFORMATION RECEIVED FOR TARGETING THE AUDIENCE AND INDIVIDUAL COMMUNICATION

FIELD OF THE INVENTION

The invention pertains to the means of providing advertising and information services, creating the possibility of analytics as well as for the purpose of individual marketing and evaluating the effectiveness of advertising and information campaigns.

BACKGROUND OF THE INVENTION

There is a method of advertising goods and/or services, which makes it possible to connect client devices of advertising users to a remote server via an integrated network, to form a remote server database of requests for the advertising of goods and/or services, where the data on goods and/or services are transmitted by using customer devices of advertising providers, including also such parameters as place of display, time of display, quantity, frequency and duration of display of advertising, to form a remote server database of electronic mobile information devices of advertising users by their identification numbers, to choose those electronic mobile information devices of advertising users that correspond to the parameters of the request for the advertising of goods and/or services, to transmit information complying with the advertising of goods and/or services to selected electronic mobile information devices of advertising users for its further displaying on the screens of the above devices, to control the correspondence of the location of electronic mobile information devices of advertising users to the parameters of the request, to turn off advertising information messages with respect to specific devices according to the results of the control of the compliance with the parameters of the request in case of non-compliance with the specified advertising parameters (see application RU2014148508A, Jun. 20, 2016, IPC G06Q30/02).

The disadvantage of this technical solution is the impossibility of the stationary placement of advertising media, especially in public places, and a complicated procedure for attracting new consumers of advertising, which negatively affects the efficiency of advertising campaigns and events.

The closest analogue of the proposed invention is the method of providing consumers with advertising information, which enables supplying at least one advertising medium with a beacon equipped with the Bluetooth Low Energy (BLE) technology and generating a BLE signal at a given periodicity, recording beacon signals with consumer mobile devices, transmitting signals that initiate the transfer of advertising packages, to the device for controlling the transfer of advertising with a view to displaying advertisements in the advertising medium (see application US2016095047A, Mar. 31, 2016, IPC H04W48/10). In this case, there are basically no restrictions on the location of advertising media, but it also complicates the procedure for accounting for the interests of a particular user, its location and movement in space relative to the advertising or information structure, which, as in the previous case, reduces the effectiveness of advertising.

The task of the invention is to increase the effectiveness of advertising campaigns and distribution of information in general. The task is resolved through the collection and processing of data, the possibility of analyzing consumer behavior, the identification of the location and movement of a potential consumer with a mobile device relative to advertising and information structures, individual communication, the targeting and retargeting of advertising and information messages (individual marketing).

SUMMARY OF THE INVENTION

The invention pertains to the means of providing advertising and information services and can be used in various environments, where a potential consumer is present and where there is an identifiable mobile device on condition that the advertising media are placed mainly on stands, posts, in and/or on buildings or other structures. In this method, a beacon (beacons) is placed in at least one advertisement medium, which generates a signal at a given periodicity, registers beacon signals with consumer mobile devices, and generates signals initiating the transfer of advertising packages to display advertisements in the advertising medium. When the mobile device is in the beacon coverage area, it is possible to calculate the mobile device traveling speed and its actual location relative to the advertising and information structure, to transfer the data on the mobile device traveling speed and the mobile device identifier to the control unit (server part), which enable estimating the duration of the interval for the mobile device being in the beacon coverage area, to record this duration and the corresponding mobile device identifier. As these data arrive, the recorded duration of the interval of the mobile device being in the beacon coverage area is compared with the specified interval duration recorded earlier and the content of information or advertising materials transmitted to the medium, and information materials are selected for the transfer according to the results of the comparison. In this case, in the beacon coverage area, each beacon signal and its reception time are recorded in the mobile device, and the distance to the beacon is estimated, which makes it possible to calculate the mobile device traveling speed. The technical result consists in increasing the effectiveness of advertising campaigns and distribution of information in general.

The technical result consists in increasing the effectiveness of advertising campaigns and distribution of information in general, identifying the exact location of the target audience in space, selecting materials in accordance with the interests and preferences of users, reducing the time of selection as well as the automation of selection due to the fact that during the period of the mobile device being in the beacon signal coverage area, advertisements or other information regarding goods, services, events, etc., the interest in which was shown earlier, may be demonstrated to the user of the mobile device.

The technical result is achieved through the development of an improved method of providing consumers with advertising information. This method consists in supplying at least one information medium with at least one beacon equipped with a wireless signal transmission and/or reception and transmission technology and generating a signal at predetermined intervals, registering beacon signals with consumer mobile devices and transmitting the same to the control device collecting and analyzing user data and initiating the transfer of information or advertising materials for its further displaying in a suitable medium. When the mobile device is in the beacon coverage area, it is possible to calculate the mobile device traveling speed, to transmit the data on the mobile device traveling speed and the mobile device identifier to the control unit (server), that collects and analyzes collected data and initiates the transfer of information or advertising materials for its further displaying in a corresponding medium, which enables calculating the duration of the interval for the mobile device being in the beacon coverage area, estimating this duration and the corresponding mobile device identifier. As these data arrive, the recorded duration of the interval of the mobile device being in the beacon coverage area is compared with the specified interval duration recorded earlier and the content of information or advertising materials transmitted to the medium, and information materials are selected for the transfer according to the results of the comparison. In this case, in the beacon coverage area, each beacon signal and its reception time are recorded in the mobile device, and the distance to the beacon is estimated, which makes it possible to calculate the mobile device traveling speed and the location of the consumer with the mobile device.

DESCRIPTION OF THE FIGURES

FIG. 1 illustrates an example of the implementation of the proposed method.

DETAILED DESCRIPTION OF THE INVENTION

At least one beacon 2 equipped with a wireless signal transmission and/or reception and transmission technology is located in the advertising medium 1. Periodically, the beacon transmits a signal that is registered with the mobile device 3, for example at points 4 and 5, when the user (consumer) 6 moves. By registering the signal when the consumer 6 enters the coverage area of the beacon 1, the signal is transmitted to the control device (not shown); as a result, the control device initiates the transmission of information for its further displaying in the medium 1. At the same time, in the coverage area of the beacon 2, each beacon signal and its reception time t1 and t2 are recorded in the mobile device 3 and the distance 51 and S2 to the beacon is calculated, which enables calculating the speed of the mobile device V=S/t.

The data on the traveling speed of the mobile device and its identifier, which enable calculating the time of the mobile device in the beacon coverage area, are transmitted to the control device collecting data and initiating the transmission of information or advertising materials for its further displaying in the respective medium; the duration and the corresponding mobile device are also recorded. As these data arrive, the recorded time of the mobile device in the beacon coverage area is compared with the specified interval duration recorded earlier and the content of information transmitted to the medium of information during this period.

The method enables accumulating data for the analysis of data on consumer behavior. It is possible to analyze the statistics of mobile device users, such as routes of travel, travel time, frequency of routes, geographical preferences, viewed information messages, including advertising messages.

The mobile device and the control device (which is a server) interact with the program, and it is possible to install the program in the user mobile device (phone, smartphone, etc.); an identifier that is stored in the server is assigned to the latter. This enables recognizing the data received by the server and sent from a specific mobile device.

The server calculates the time, during which the potential consumer sees or can see the information medium. The server compares and analyzes the data with earlier data regarding this mobile device. The system also has the capacity to match and adjust the digital data received from beacons (without additional interpretation) to the registration data of the mobile device in Wi-Fi, on the Internet, in social and other networks. During the period of the mobile device in the beacon signal coverage area, the information regarding goods, services, events, etc., the interest in which was shown earlier as well as which may be of interest for the mobile device user according to the results of the comparison of the data, can be demonstrated to the latter.

Both the comparison and reconciliation of the data enable the analysis of behavior of the user in various environments.

The system enables analyzing the audience of the advertising and information medium, calculating its effectiveness and coverage.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A system for distributing of advertising information and analyzing a consumer behavior of a potential audience for advertising, the system comprising:
    an advertising medium;
    a beacon located within the advertising medium, wherein the beacon is configured to generate and transmit one or more registerable signals at predetermined intervals, and wherein the beacon comprises a wireless signal transmission or a wireless signal reception and transmission technology;
    a mobile device of a user configured to receive the one or more registerable signals generated by the beacon when the user is in a coverage area of the beacon, and wherein the mobile device of the user is configured to:
      record the one or more registrable signals generated by the beacon;
      record a reception time of each of the one or more registrable signals generated by the beacon;
      determine one or more distances of the mobile device of the user to the beacon to identify one or more intervals of travel of the user in the coverage area;
      estimate a speed of travel of the user within each interval of travel of the user in the coverage area, wherein the speed is estimated by dividing a positive difference between the one or more distances of the mobile device to the beacon by a positive difference between the reception time of each of the one or more registered signals received by the mobile device; and
      determine a direction of movement of the user based at least on the reception time of each of the one or more registrable signals received by the mobile device of the user; and
    a server configured to:

receive from the mobile device of the user the one or more registrable signals generated by the beacon;

receive from the mobile device of the user the speed of travel of the user within each interval of travel of the user in the coverage area;

receive from the mobile device of the user an identifier of the mobile device of the user;

transmit an advertising information to be displayed on the advertising medium;

determine a duration of the user in the coverage area of the beacon by totaling one or more ratios comprising the positive difference between the one or more distances of the mobile device to the beacon over the speed of travel of the mobile device of the user within corresponding interval of travel of the user in the coverage area;

analyze a consumer behavior of the user by comparing the duration of the user in the coverage area of the beacon with a recorded duration of the user in the coverage area of the beacon;

evaluate the consumer behavior of the user by analyzing statistical data of the mobile device of the user, the statistical data comprising (i) time during which the user traveled in the coverage area, (ii) frequency of routes traveled by the user in the coverage area, and (iii) information messages viewed by the user during a route in the coverage area;

wherein the server is configured to (1) determine and store the duration of the user in the coverage area of the beacon, (2) store the speed of travel of the user within each interval of travel of the user in the coverage area, and (3) store the identifier of the mobile device of the user, and wherein the server is further configured to analyze a consumer behavior of the user by comparing the advertising information displayed on the advertising medium during the duration of the user in the coverage area with the advertising information displayed on the advertising medium during the recorded duration of the user in the coverage area.

2. The system of claim 1, wherein the server is further configured to determine a time frame during which the user is exposed to the advertising medium.

3. The system of claim 1 further comprising a software program installed on the mobile device of the user, wherein the software is programmed to interact with the server and the mobile device.

4. The system of claim 1, wherein the server is configured to match the advertising information to be displayed on the advertising medium to registration information of the mobile device on Internet or social networks, wherein the registration information relates to goods, services, or events of interest to the user.

5. The system of claim 1, wherein the beacon is located at least within or outside the advertising medium.

6. A method for distributing of advertising information and analyzing a consumer behavior of a potential audience for advertising, the method comprising:

providing at least one information medium with at least one beacon equipped with a wireless signal transmission technology or a wireless signal reception and transmission technology;

generating, by the at least one beacon, one or more registrable signals at predetermined intervals and transmitting the one or more registrable signals to a mobile device of a user;

receiving by the mobile device of the user the one or more registrable signals generated by the at least one beacon;

determining that the mobile device of the user is in a coverage area of the at least one beacon;

recording, by the mobile device of the user, the one or more registrable signals generated by the at least one beacon;

recording, by the mobile device of the user, a reception time of each of the one or more registrable signals generated by the at least one beacon;

determining, by the mobile device of the user, one or more distances of the mobile device of the user to the at least one beacon to identify one or more intervals of travel of the user in the coverage area;

estimating, by the mobile device of the user, a speed of travel of the user within each interval of travel of the user in the coverage area, wherein the speed is estimated by dividing a positive difference between the one or more distances of the mobile device to the at least one beacon by a positive difference between the reception time of each of the one or more registered signals received by the mobile device;

determining, by the mobile device of the user, a direction of movement of the user based at least on the reception time of each of the one or more registrable signals received by the mobile device of the user;

receiving by a server from the mobile device of the user the one or more registrable signals generated by the at least one beacon;

receiving by the server from the mobile device of the user the speed of travel of the user within each interval of travel of the user in the coverage area;

receiving by the server from the mobile device of the user an identifier of the mobile device of the user;

initiating, by the server, a transfer of information or advertising materials to be displayed on the at least one information medium;

determining by the server a duration of the user in the coverage area of the at least one beacon by totaling one or more ratios comprising the positive difference between the one or more distances of the mobile device to the at least one beacon over the speed of travel of the mobile device of the user within corresponding interval of travel of the user in the coverage area;

analyzing a consumer behavior of the user by comparing the duration of the user in the coverage area of the at least one beacon with a recorded duration of the user in the coverage area of the at least one beacon; and evaluating the consumer behavior of the user by analyzing statistical data of the mobile device of the user, the statistical data comprising (i) time during which the user traveled in the coverage area, (ii) frequency of routes traveled by the user in the coverage area, and (iii) information messages viewed by the user during a route in the coverage area;

analyzing, by the server, a consumer behavior of the user by comparing the advertising information displayed on the at least one information medium during the duration of the user in the coverage area with the advertising information displayed on the at least one information medium during the one or more recorded durations of the user in the coverage area of the at least one beacon.

7. The method of claim 6 further comprising determining by the server a time frame during which the user is exposed to the at least one information medium.

8. The method of claim 6 further comprising matching by the server the advertising information to be displayed on the at least one information medium to registration information of the mobile device on Internet or social networks, wherein the registration information relates to goods, services, or events of interest to the user.

9. The method of claim 6 further comprising storing, by the server, the speed of travel of the user within each interval of travel of the user in the coverage area and the identifier of the mobile device of the user.

10. The method of claim 6 further comprising installing a software program on the mobile device of the user, wherein the software is programmed to interact with the server and the mobile device of the user.

11. The method of claim 10 further comprising analyzing the consumer behavior of the user by analyzing statistical data of the mobile device of the user, the statistical data including routes of travel, travel time, frequency of routes, geographical preferences, and viewed information messages.

12. The method of claim 6 further comprising determining a location of the mobile device of the user relative to the at least one information medium.

* * * * *